(12) United States Patent
Banschbach

(10) Patent No.: US 9,487,064 B2
(45) Date of Patent: Nov. 8, 2016

(54) AIR NOZZLE

(71) Applicant: AURORA Konrad G. Schulz GmbH & Co. KG, Mudau (DE)

(72) Inventor: Thomas Banschbach, Osterburken (DE)

(73) Assignee: Aurora Konrad g. Shulz gmBH & Co. Kg, Mudau (DE)

( * ) Notice: Subject to any disclaimer, the term of this patent is extended or adjusted under 35 U.S.C. 154(b) by 728 days.

(21) Appl. No.: 13/671,030

(22) Filed: Nov. 7, 2012

(65) Prior Publication Data

US 2013/0306760 A1 Nov. 21, 2013

(51) Int. Cl.
*B60H 1/34* (2006.01)
*B60H 1/00* (2006.01)

(52) U.S. Cl.
CPC ........ *B60H 1/3428* (2013.01); *B60H 1/00535* (2013.01); *B60H 1/00564* (2013.01); *B60H 1/34* (2013.01); *B60H 2001/3492* (2013.01)

(58) Field of Classification Search
CPC .. B60H 1/3428; B60H 1/34; B60H 1/00535; B60H 1/00564; B60H 2001/3492
USPC .......... 239/600, 503; 454/154, 152, 143, 69, 454/349, 155
See application file for complete search history.

(56) References Cited

U.S. PATENT DOCUMENTS

| | | | | |
|---|---|---|---|---|
| 3,460,855 A | * | 8/1969 | Belden | ............................ 285/44 |
| 5,492,456 A | * | 2/1996 | Knight et al. | ................. 417/360 |
| 5,746,651 A | * | 5/1998 | Arajs et al. | ................... 454/154 |
| 5,752,877 A | * | 5/1998 | Sun | ............................... 454/155 |
| 6,016,976 A | | 1/2000 | Kern | |

FOREIGN PATENT DOCUMENTS

| | | |
|---|---|---|
| DE | 102 48 740 A1 | 4/2004 |
| DE | 10 2006 029 949 A1 | 1/2008 |
| DE | 20 2009 004 949 U1 | 10/2009 |

* cited by examiner

*Primary Examiner* — Arthur O Hall
*Assistant Examiner* — Juan C Barrera
(74) *Attorney, Agent, or Firm* — Thompson & Thompson Patents; John C. Thompson; Sandra J. Thompson

(57) ABSTRACT

This invention relates to an air nozzle, comprising a flange intended for the attachment to a vehicle body opening, and comprising at least one air guiding element via which air flowing through the air nozzle can be deflected. Furthermore, at least two, in particular three, pivot stubs (18,20,22) are mounted to the flange (16) whose pivot axis (61) extends substantially parallel to the axis of the air flow through the air nozzle (10) before reaching the air guiding elements, and the pivot stubs (18, 20, 22) are movable in a direction parallel to their pivot axis (61).

10 Claims, 6 Drawing Sheets

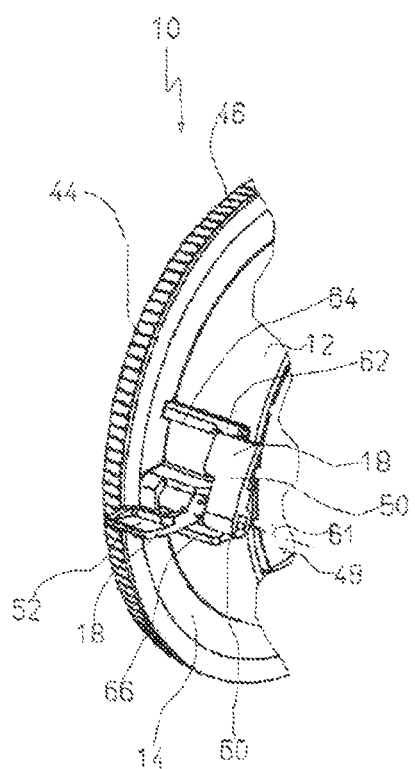
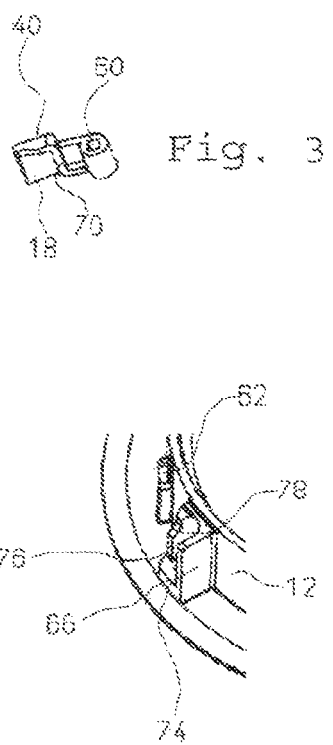
Fig. 2    Fig. 3    Fig. 4

AIR NOZZLE

CROSS-REFERENCE TO RELATED APPLICATIONS

This application claims foreign priority benefits under 35 U.S.C. §119(a)-(d) from German patent application ser. no. 10 2011 055 292.8 filed Nov. 11, 2011.

TECHNICAL FIELD

The invention relates to an air nozzle, and more particularly to an air nozzle, having a flange intended for the attachment to a vehicle body opening, and including at least one air guiding element via which air flowing through the air nozzle can be deflected, and having pivot stubs which are mounted to the flange whose pivot axis extends substantially parallel to the axis of the air flow through the air nozzle before reaching the air guiding elements, and that the pivot stubs are moveable in a direction parallel to their pivot axis

BACKGROUND OF THE INVENTION

Air nozzles for vehicles are used on a large scale, and due to the large quantities produced and the associated low production costs which are required, it is necessary to carry out a standardization of both the sizes and the types.

On the other hand, different vehicles comprise completely different ventilation situations, so that e.g. a windshield defroster nozzle having a throw distance which is as high as possible has to be constructed totally differently from a legroom air outlet.

In many cases it is desired to influence the outlet of air by the user, for example via a slider, which influences the outlet cross section, or via lamellae, which influence the direction of the outlet of air.

But there are also simpler air nozzles, which are also referred to as air outlets, and which are provided with fixed lamellae and are formed as an integral plastic part, in most cases.

Besides these different requirements which require a considerable variety of production on the part of the manufacturers of air nozzles, automotive manufacturers often proceed to freely locate the desired installation site of the air nozzle.

While typically an installation in a body opening made of sheet steel on the one hand or of sheet aluminum on the other hand does not pose any problems due to the comparatively small difference in thickness of sheet steel and sheet aluminum and as a safe locking is possible through detents known per Se, this does not hold true without further ado for the installation at the dashboard or e.g. at other plastic coverings in a vehicle. There, completely different thicknesses of the base material are used, and sometimes foamed materials are also used, many times for safety reasons, i.e. to keep the risk of injuries as low as possible in case of a possible collision with vehicle passengers.

DE 20 2009 004 949 U discloses an air nozzle comprising a combined screw/lock fastening, wherein the screw is intended to pass through the snap-in tongue.

With the help of the inclined plane at the snap-in tongue a difference in thickness of the installation wall can be compensated. for to a certain extent. However, this compensation is not sufficient to cover the possible installation sites so that in such a nozzle still at least four or five different nozzles of each nozzle type have to be made available in order to cover the possible installation sites.

Pure screw fastening is also possible, as can be seen e.g. from U.S. Pat. No. 6,016,976. In a pure screw fastening it is possible to provide for additional screw holes adjacent to the body opening and to make possible to lock the air nozzle even at an installation from the front side, as is always desired.

However, such additional cutouts in bodies multiply the effort in the production of the body openings and may also pose adjustment and adaptation problems. While in round nozzles that click into place angle errors do not play any role, this does not hold true for screw fastening nozzles as the screw holes have to be in exact alignment with the cutouts for the screws.

For reasons of the simplification of the installment, therefore, snap-lock connections have been desired up to now which are, however, not problem-free either. For instance, DE 102 48 740 A1 (see paragraph [0005] and paragraph [0006]) discusses the problem that protruding snap4n tongues break easily when they are accidentally installed at an angle.

Moreover, snap-in tongues also those comprising slanted planes which should, however, not exceed a certain tilt angle are typically suitable for balancing different thicknesses of metal sheet, but not completely different installation sites.

Furthermore, DE 10 2006 029 733 A1 discloses an air nozzle which has a relatively flat design, on the one hand, and which is also supposed to cover different material thicknesses, on the other hand. For this purpose, a clamping element with different snap-in elements is provided.

Generally, this solution is well suited for covering different wall thicknesses. It is, however, rather intended for flat and therefore lightweight nozzles, while a fine adjustment is slightly overstrained in the application of larger and heavier nozzles, such as lamellar spreader rolling.

Furthermore, it has already been suggested to use an adjustable sliding mechanism for adapting to different wall thicknesses in the bearing housings for air nozzles, which does not only facilitate the adaptation to different material thicknesses of the dashboard or any other installation site but which can also balance an unevenness to a certain extent. Typically, the bearing flange of the bearing housing has a circular shape while the installation site can in part also be at a curved sheet metal. But still a sealing must be guaranteed, which is a problem to a certain extent. For this purpose, a sealant can for instance be introduced before the installation takes place in order to carry out sealing.

However, a further problem is the tendency of the suggested air nozzles to detach due to the permanent vibrations, because if there is a slight play already, the bearing is burdened to an ever increasing extent, until the air nozzle eventually blocks.

OBJECTS AND SUMMARY OF THE INVENTION

In contrast, the invention is still based on the task of creating a cost-effective air nozzle, which can be used more universally, which means that it is also suitable for larger and heavier nozzles and facilitates a permanent safe bearing, also when it comes to different material thicknesses of the installation site.

According to the invention, it is especially favorable if the pivot stubs, of which at least two, preferably three, are mounted at the circumference of the air nozzle, can be moved by inventive bearing elements.

The bearing elements have the dual function of facilitating the pivot movement of the pivot stubs on the one hand, and of facilitating a movement towards the pivot axis, on the other hand.

In an advantageous development of the invention, the bearing elements are formed as screws in order to facilitate an axial displacement corresponding to the pitch of their threads.

It is inventively preferred that the movement in an axial direction takes place subsequent to the pivot movement, in fact when the bearing element is actuated concordantly.

Instead of a screw, the bearing element can also be formed as a journal with a corresponding operating gate, as a slide guide, or e.g. via a stationary axis, which is covered by a sleeve which either comprises a gate itself or is guided by a gate fixed to the air nozzle.

It is especially favorable that the actuation takes place in one go and if in the actuation the pivoting of the pivot stubs takes place first so that, in the installation of the air nozzle, the pivot stub is pivoted from its substantially tangential orientation to the substantially radial direction before it is displaced axially, and finally serves the fixed mounting against the body opening. Therefore, it is provided according to the invention that the pivot stubs are mounted to the flange, namely in particular via special bearing elements, wherein their pivot axis extends substantially parallel to the axis of the air flow through the air nozzle, before reaching the air guiding elements, and wherein the pivot stubs are pivotable, i.e. away from the interior of the air nozzle to the outside.

When installing the air nozzle according to the invention, the pivot stubs remain substantially tangentially to the flange at first, i.e. abut against it or are at least substantially parallel to the outside. Preferably, the pivot stubs are slightly clipped or snap-locked in place or lie flat against that element by friction. Insofar, their position is secured in pivot direction as well as in an axial direction. This securing prevents the pivot stub from unintentionally moving away from its starting position, e.g. in the direction of the air outlet of the air nozzle. Preferably, bearing elements are provided which are formed as screws and, in that position, their screw heads flush with the circumferential part of the flange of the air nozzle.

If any work was done without the aforementioned securing, there was the danger that the screws would move into the outlet direction, especially in case of overhead assembly. Pivoting would then not be possible anymore as the pivot stubs would then be located on the axial height of the body opening and would have to be pushed back again in order to be pivoted.

On the other hand, without the pre-securing in the pivot direction there was the danger that the pivot stubs would swivel out, i.e. would protrude from the air nozzle. Then, an assembly would not be possible as the pivot stubs which are swiveled out have larger dimensions than the body opening.

After inserting the air nozzle with the predetermined position of the pivot stubs, at least one screw forming the bearing element is actuated. Through the actuation of the screw against the resistance of the securing, which can be formed by a slight clipping into place, the pivot stub is first moved in the protruding direction in which it protrudes at an angle of about 900 to the side.

When further tightening the screw, through its thread the pivot stub is axially displaced, i.e. basically in such a way that it moves from behind to the body opening. This is continued until the pivot stub abuts against the body opening from behind.

Preferably, both the pivot stub and the housing of the air nozzle are made of a plastic material which is, at least to some degree, elastic. This leads to a bias favorable for the bearing when the pivot stub abuts against the body opening.

It is especially important that the wall thickness of the body opening can vary in many areas in this type of assembly without having to provide another air nozzle.

Due to the universal usability of the air nozzle, the plurality of air nozzles which needs to be provided is drastically reduced so that only one single type of each air nozzle has to be held ready.

The tightening of the screw corresponds to the thickness of the wall of the body. This can even, for instance, amount to several cm so that the axial actuating path of the pivot stubs has to amount to several cm, too, as the same air nozzle has to be able to be mounted to both a body wall made of sheet metal and a foamed dashboard having a wall thickness of, for instance, 1 or even 2 cm.

It is to be understood that the friction conditions of the clipping-in device, thread and pivot friction of the pivot stub have to be adjusted to the requirements in order to ensure the desired sequence of the three sequences of movements which are succeeding one another.

It is to be understood that the inventive air nozzle is by no means limited to a round air nozzle. Rather, rectangular combination air nozzles comprising a nozzle array of e.g. 20×30 cm can be installed without further ado according to the invention. Such air nozzles are typically provided with several nozzle outlets with different air guiding elements and can further be adjusted with reference to their flow intensity to a significant degree.

The inventive flange can be part of the housing or can be provided separately. It can be ring-shaped i.e. circular for circular air nozzles or L-shaped, and typically the protruding part of the flange is supported by the body opening.

The pivotable pivot angle of the pivot stubs can preferably be limited by stops. The stop in drive direction of the screw must be rigid, as the friction of the screw arranged in the pivot stub must be smaller than the flexibility of this stop.

It is also to be understood that the outer diameter of the flange and the external dimensions of the pivot stubs must be larger than the body opening in order to ensure the desired bearing by clamping the body wall between the flange and the pivot stubs and that the outer diameter of the housing of the air nozzle without the flange or without the protruding part of the flange and when the pivot stubs abut, is smaller than the diameter of the body opening.

According to the invention it is especially favorable if a contact surface is provided at the pivot stub which points in the direction of the air outlet and is insofar intended for the support at the body wall from behind. The broadened contact surface ensures a better distribution of power and a reduced pressure on the body wall which is important when soft materials, such as foamed plastic materials, are used for the body wall.

Further advantages, details and features may be taken from the following description of an embodiment of the invention by means of the figures.

BRIEF DESCRIPTION OF THE FIGURES

FIG. 2 shows a back perspective view of the air nozzle;

FIG. 3 shows a perspective view of an inventive pivot stub;

FIG. 4 shows a perspective view of the bearing of the pivot stub according to FIG. 3 which is intended for the installation in the housing of the air nozzle according to the invention;

DETAILED DESCRIPTION

Figure 1:
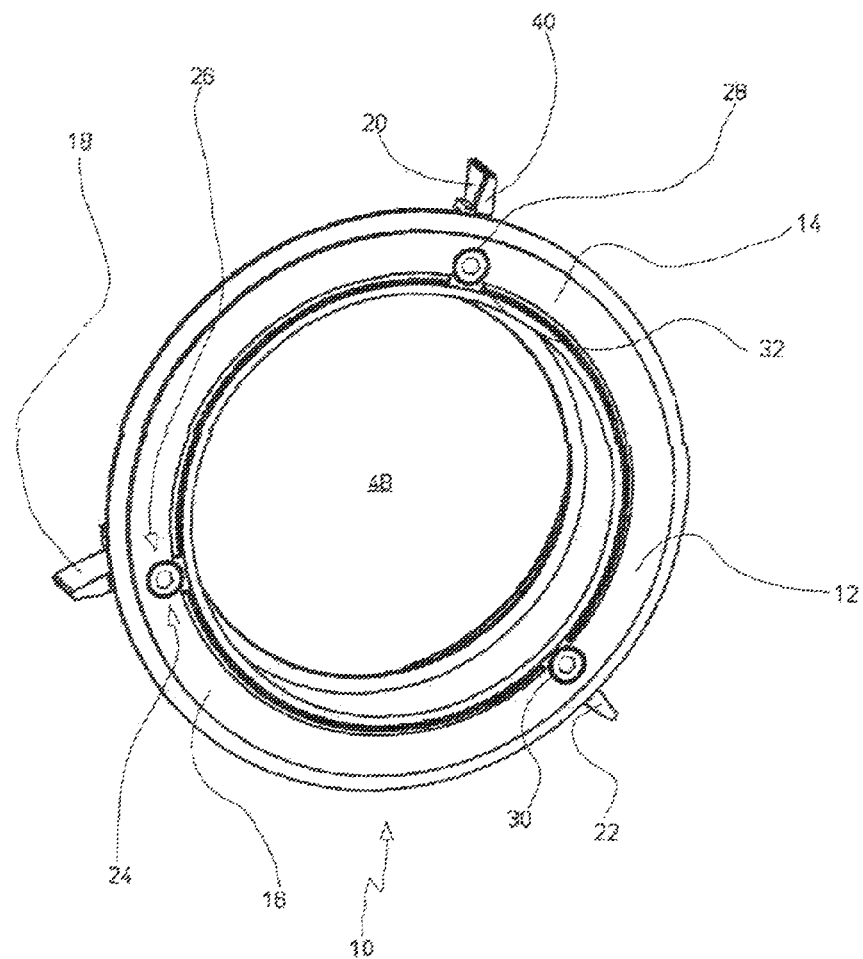
FIG. 1 shows a perspective schematic view of a part of an inventive air nozzle in one embodiment.
Figure 5:
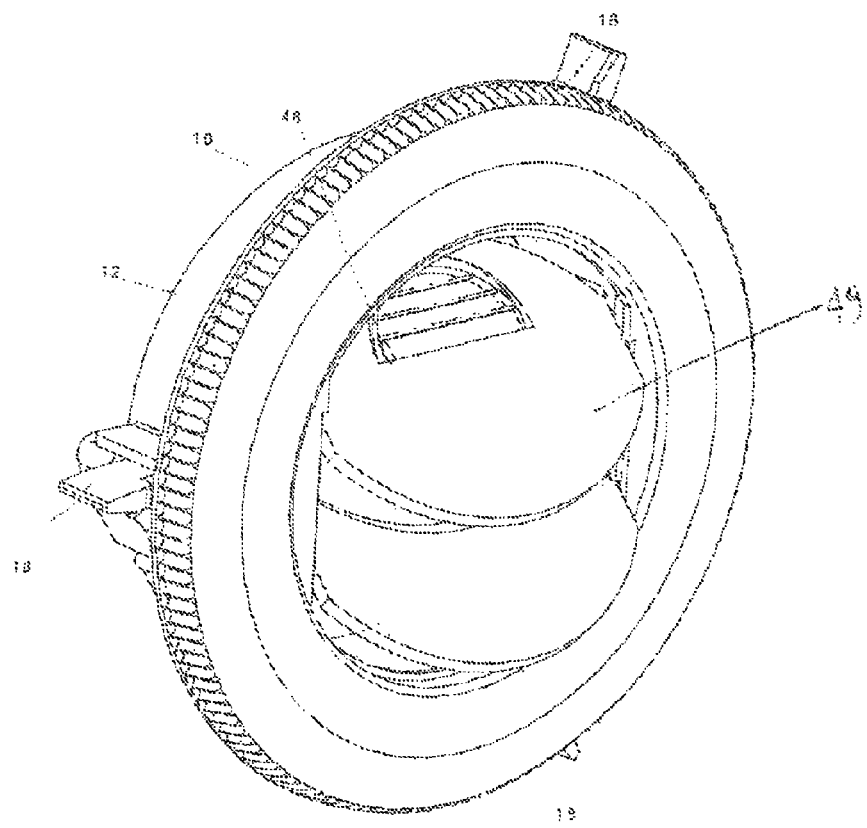
FIG. 5 shows a perspective view of the front of an assembled air nozzle, with the air guiding elements partially open.
Figure 6:
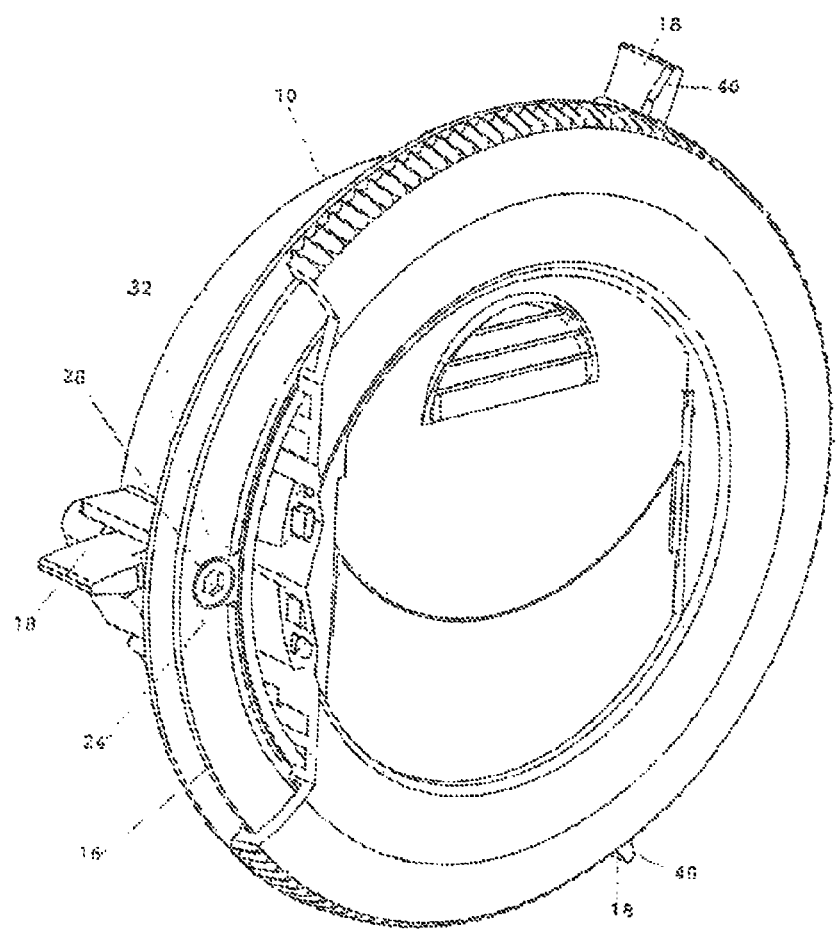
FIG. 6 shows a perspective view of the front of an assembled air nozzle as in FIG. 5, with the air guiding elements close.
Figure 7:
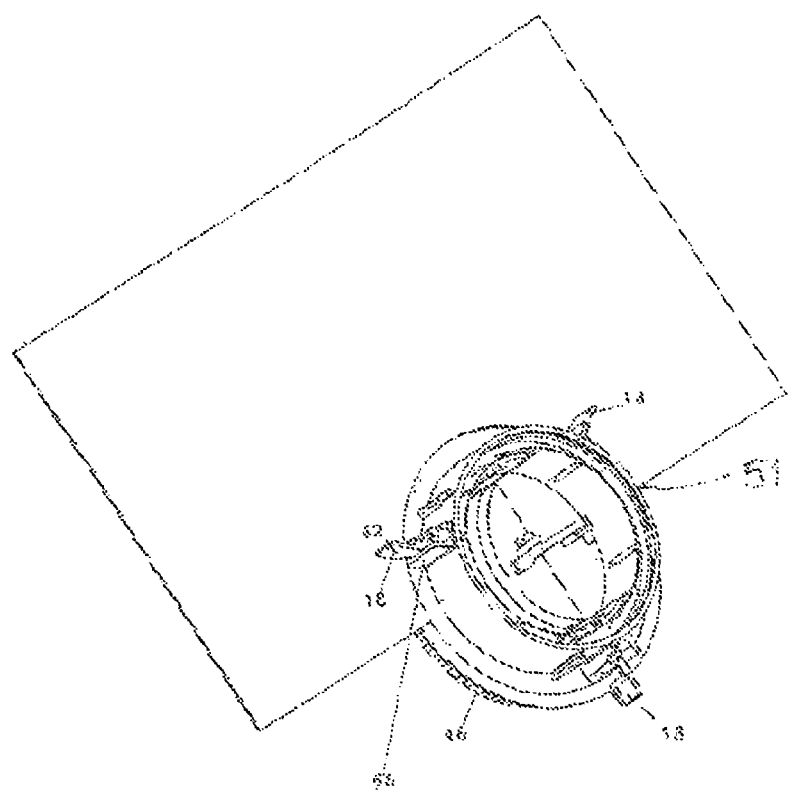
FIG. 7 shows a rear perspective view of the air nozzle mounted in a body opening.
Figure 8:
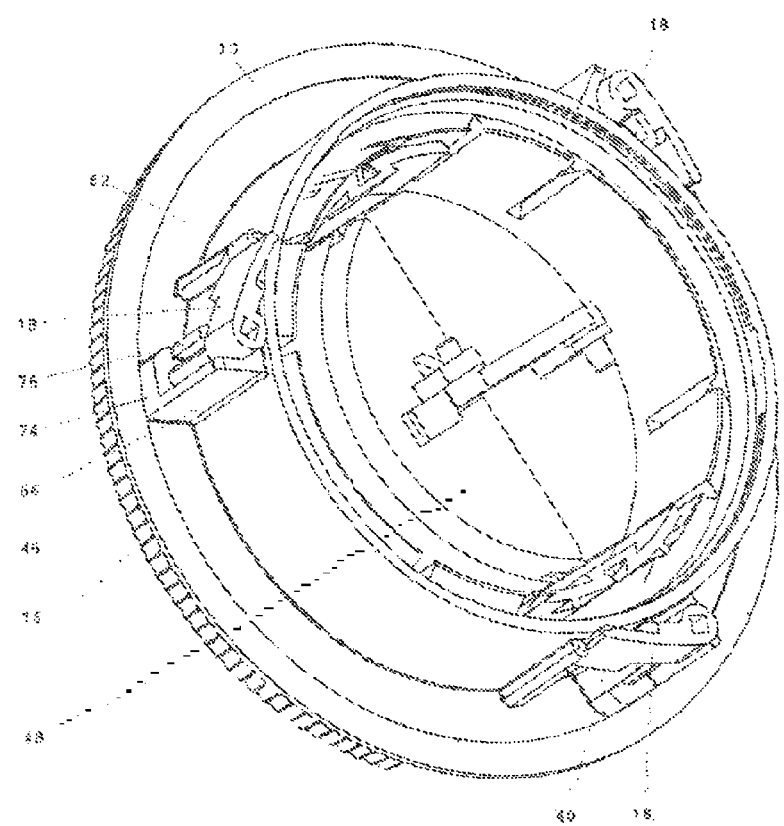
FIG. 8 shows a back perspective view of the air nozzle as shown in FIG. 2, with the pivot stubs in another postion.

FIG. 1 illustrates a perspective view of an air nozzle 10 in detail. A housing 12 in the form of an outer ring can be seen which—as is given in the comparison in FIG. 2—is complemented by an inner ring which in turn covers the front side of the outer ring.

FIG. 1 shows the uncovered outer ring 14. As can be seen, it is provided with a circumferential flange 16 which is formed as a circle in the embodiment illustrated and which extends in a two-dimensional way across a body opening 51

In the outer ring an inner ring is received in a snap-in manner in a way known per se and is rotatable in it. The inner ring is provided with air guiding elements 49 which serve to deflect or—if necessary—reduce the air flowing through the air nozzle.

The housing 12 extends parallel to the discharge direction to the back. As can be seen schematically from FIG. 1, in this example three pivot stubs 18, 20 and 22 are mounted in an equal distribution around the periphery of the housing 12. In the example illustrated, the pivot stubs 18 to 22 are shown in the protruding position. Their pivot position, but also their axial position, can be determined via bearing elements 24, wherein the bearing elements are formed by three screws 26, 28 and 30 in the embodiment illustrated, each of the screw heads 32 being illustrated as a cross recess.

The body wall not shown which surrounds the body opening extends between the pivot stubs 18 to 22 and the flange 16. The axial displacement of the pivot stubs 18 to 22 to the front, i.e. towards the drawing plane, clamps the body wall towards the flange 16. For this purpose, every pivot stub 18 to 22 is provided with a contact surface 40 which is otherwise broadened slightly relative to the pivot stub 18 to 22, namely in tangential direction in the position of the pivot stubs illustrated in FIG. 1.

The contact surface 40 is tapered slightly radially towards the outside—again considered in the position according to FIG. 1—in order to facilitate an easier abutment When the pivot stubs are swiveled in.

FIG. 2 shows a part of the inventive air nozzle 10. Here, the inner ring 44, which is provided with a knurling 46 in the outside, is attached to the outer ring 14. It extends into the discharge opening 48 of the air nozzle 10 and also covers the flange 16 so that the screw heads 32 (see FIG. 1) are covered by the inner ring 44.

The inner ring 44 is only attached or plugged-in when the assembly of the outer ring has been completed.

FIG. 2 also shows that the pivot stub 18 can occupy two completely different positions which—for reasons of simplicity—are both illustrated in FIG. 2. In the swiveled-in position 50, the pivot stub 18 extends substantially in abutment with the housing 12 of the air nozzle 10. In this position, it is substantially displaced towards the back relative to the other position, i.e. away from the air guiding elements.

In the swiveled-out position 52 the pivot stub 18 extends in a substantially radial manner, i.e. away from the discharge opening 48 of the air nozzle to the outside. By tightening the screw 26 which can be seen in FIG. 1 but is not illustrated in FIG. 2, the displacement from position 50 to position 52 is implemented. For this purpose, the screw 26 extends through a passage recess 60 in the pivot stub 18. Here, the screw 26 engages its thread and exerts a pivot force to the pivot stub 18 through the thread friction. The pivot axis 61 extends coaxially through the passage recess 60.

The pivot movement of the pivot stub 18 is limited by stops. In the swiveled-in position 50, the pivot stub is adjacent to the housing 12. It is held in this position by a holding projection 62. The determination of the position, however, takes place using only low force which is lower than the friction force of the thread engagement between screw 26 and pivot stub 18.

Accordingly, when turning the screw 26, the holding position of the pivot stub 18 at the holding projection 62 is released, and the pivot stub 18 can be swiveled freely to the swiveled-out position 52.

In order to prevent the pivot stub 18 from reaching behind the holding projection 62 in th~axial front position (corresponding to the swiveled-out position 52), an additional locking projection 64 is provided to prevent exactly that from happening.

Opposite the holding projection 62 a stop rib 66 is formed which limits the swivel movement of the pivot stub 18 towards the swiveled-out position 52. In the embodiment illustrated, the swivel angle between positions 50 and 52 amounts to approximately 100°; it is to be understood, however, that the possible pivot angle can be adjusted to the sizing of the pivot stub 18 and the remaining dimensioning to a large extent.

During the assembly of the air nozzle, inner ring 44 and outer ring 14 are separated. The outer ring 14 is introduced into the body opening at a swiveled-in position 50 of the pivot stubs 18 to 22. In this position, the pivot stubs 18 to 22 are each also axially determined by the holding projection 62.

As soon as the desired position of the outer ring 14 of the air nozzle 10 is reached, at least one of the screws 26 to 30 is actuated so that first the pivot stub 18 is transferred to the swiveled-out back position—which is not illustrated in any of the figures—and then to the swiveled-out front position 52 illustrated in FIG. 2. In this position the body wall is clamped between the contact surface 40 and the flange 16.

Subsequently, the other pivot stubs are also transferred to the position 52, and afterwards the inner ring 44 is clipped into place so that the screw heads 32 are covered.

The structure of a pivot stub 18 can be seen from FIG. 3. Here, a rigidity rib 70 is also shown which serves to improve the rigidity of the pivot stub 18. The comparison of FIG. 2 and FIG. 3 shows that the inclined section 72 of the contact surface 40 improves the slenderness of. the embodiment in the swiveled-in position 50.

FIG. 4 shows that the outer ring 14 with the housing 12 and the further parts described herein, except for the pivot stub 18, can be implemented integrally without further ado. The stop rib 66 extends radially outward and has a solid construction and is additionally stiffened by a block 74 adjacent to the flange. Furthermore, a guide rib 76 is provided opposite the stop rib 66 at the bearing of the pivot stub 18 which comprises a further inclined surface 78 which, at a radial displacement of the pivot stub 18, pushes this stub from the swiveled-in position 50 to the outside.

Also with regard to the holding projection 62, FIG. 4 shows that this projection is only formed in a crowned manner at a rib, so that an easy locking is possible, without preventing a swiveling out of the pivot rib when the torque of the screwing force is applied.

It is to be understood that it is possible without further ado according to the invention to automate the assembly of the inventive air nozzle. For instance, insertion of the outer ring 14 with the pre-assembled and swiveled-in pivot stubs 18 to 22 can be done via an assembly robot which can also fasten the screw heads 32 without further ado.

Therefore, the inventive air nozzle allows for an insofar easy assembly suitable for automation, and therefore also for a cost-effective assembly.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. An air nozzle, comprising
a flange;
at least one air guiding element through which air flowing through the air nozzle can be deflected;
at least two pivot stubs, each pivot stub having a pivot axis; and
at least two bearing elements, each bearing element associated with one pivot stub;
wherein the flange is configured to be attached to a vehicle body opening;
wherein each pivot axis extends substantially parallel to an axis of air flow through the air nozzle before reaching the at least one air guiding element;
wherein the at least two pivot stubs are movable in a direction parallel to their pivot axes;
wherein each pivot stub is mounted to a bearing element;
wherein each bearing element is mounted to the flange;
wherein each bearing element is a screw; and
wherein each bearing element facilitates the movement of the pivot stub both in a direction to the pivot axis and in a pivoting direction.

2. An air nozzle, comprising:
a flange configured to be attached to a vehicle body opening;
at least one air guiding element through which air flowing through the air nozzle can be deflected;
at least two pivot stubs, each pivot stub having a pivot axis, and each pivot axis having a recess; and
at least two bearing elements;
wherein the at least two pivot stubs are mounted to the flange;
wherein the at least two pivot stubs are movable in a direction parallel to their pivot axes;
wherein each pivot axis extends substantially parallel to an axis of air flow through the air nozzle before reaching the at least one air guiding element;
wherein each bearing element is associated with a pivot stub;
wherein each bearing element is an external thread;
wherein each bearing element enters the recess in the pivot axis or extends through the recess in the pivot axis.

3. An air nozzle, comprising:
a flange configured to be attached to a vehicle body opening;
at least one air guiding element through which air flowing through the air nozzle can be deflected;
at least two pivot stubs, each pivot stub having a pivot axis; and
at least two bearing elements, each bearing element associated with a pivot stub;
wherein the at least two pivot stubs are mounted to the flange in a rotary and freely displaceable way parallel to the pivot axis;
wherein at least two stops are formed for the displacement of the bearing element parallel to the pivot axis;
wherein one of the at least two stops is formed by the pivot stub or its support at the vehicle body opening;
wherein one of the at least two stops is formed by a portion of the bearing element;
wherein each pivot axis extends substantially parallel to a direction of air flow through the air nozzle before reaching the at least one air guiding element; and
wherein the at least two pivot stubs are movable in a direction parallel to their pivot axes.

4. An air nozzle, comprising:
a flange configured to be attached to a vehicle body opening;
at least one air guiding element through which air flowing through the air nozzle can be deflected;
at least two pivot stubs, each pivot stub having a pivot axis and an aperture; and
at least two bearing elements;
wherein the at least two pivot stubs are mounted to the flange;
wherein the at least two bearing elements are each associated with a pivot stub;
wherein each pivot axis extends substantially parallel to an axis of air flow through the air nozzle before reaching the at least one air guiding element;
wherein each bearing element is formed as a screw and provided with an external thread entering the aperture of the pivot stub; and
wherein the at least two pivot stubs are movable in a direction parallel to their pivot axes.

5. An air nozzle, comprising: a housing; a flange configured to be attached to a vehicle body opening; at least one air guiding element through which air flowing through the air nozzle can be deflected; at least two pivot stubs, each pivot stub having a pivot axis;
and at least two bearing elements, each bearing element associated with a pivot stub;
wherein the at least two pivot stubs are mounted to the flange wherein each pivot axis extends substantially parallel to an axis of air flow through the air nozzle before reaching the at least one air guiding element; wherein the at least two pivot stubs are movable in a direction parallel to their pivot axes; wherein the flange is formed as an element of the housing; wherein the flange is substantially L-shaped; wherein an outwardly projecting part of the air nozzle is supported by the vehicle body opening; and wherein the bearing elements of the pivot stubs extend through the body opening.

6. The air nozzle of claim 5, wherein the bearing elements are screws.

7. An air nozzle, comprising:
a flange configured to be attached to a vehicle body opening;
at least one air guiding element through which air flowing through the air nozzle can be deflected;
at least two pivot stubs, each pivot stub having a pivot axis; and
at least two bearing elements;
wherein the at least two pivot stubs are mounted to the flange
wherein each pivot axis extends substantially parallel to an axis of air flow through the air nozzle before reaching the at least one air guiding element;
wherein the at least two pivot stubs are movable in a direction parallel to their pivot axes;
wherein each of the bearing elements is associated with one of the pivot stubs;
wherein each of the bearing elements is formed as a screw; and
wherein, when tightened, each of the bearing elements produces a protruding position of the pivot stub by first producing a pivoting movement of the pivot stub and then producing an axial movement of the pivot stub.

8. The air nozzle according to claim 7, wherein the air nozzle has an air discharge direction; and wherein the axial movement of the pivot stub (18, 20, 22) takes place in the discharge direction of the air nozzle.

9. An air nozzle, comprising:
a flange configured to be attached to a vehicle body opening;
at least one air guiding element through which air flowing through the air nozzle can be deflected;
at least two pivot stubs, each pivot stub having a pivot axis; and
at least two bearing elements in the form of screws, each bearing element associated with one of the pivot stubs;
wherein the at least two pivot stubs are mounted to the flange;
wherein each pivot axis extends substantially parallel to an axis of air flow through the air nozzle before reaching the at least one air guiding element;
wherein the at least two pivot stubs are movable in a direction parallel to their pivot axes;
wherein an inclined plane is formed at the air nozzle or at one of the pivot stubs when one of the bearing elements is tightened; and
wherein the inclined plane pushes one of the pivot stubs in an outward direction.

10. An air nozzle, comprising: an outer housing; an inner housing; a flange configured to be attached to a vehicle body opening; at least one air guiding element through which air flowing through the air nozzle can be deflected; at least two pivot stubs, each pivot stub having a pivot axis; at least two bearing elements, each bearing element associated with one pivot stub; wherein the flange is mounted to the outer housing; wherein the inner housing is pivotably mounted to the flange; wherein the inner housing carries the at least one air guiding element; wherein the at least two pivot stubs are mounted to the flange; wherein each pivot axis extends substantially parallel to an axis of air flow through the air nozzle before reaching the at least one air guiding element; and wherein the at least two pivot stubs are movable in a direction parallel to their pivot axes.

* * * * *